(12) United States Patent
Sistla

(10) Patent No.: US 7,991,966 B2
(45) Date of Patent: Aug. 2, 2011

(54) EFFICIENT USAGE OF LAST LEVEL CACHES IN A MCMP SYSTEM USING APPLICATION LEVEL CONFIGURATION

(75) Inventor: Krishnakanth V. Sistla, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 11/026,195

(22) Filed: Dec. 29, 2004

(65) Prior Publication Data

US 2006/0143408 A1 Jun. 29, 2006

(51) Int. Cl.
*G06F 12/00* (2006.01)

(52) U.S. Cl. ........ 711/145; 711/118; 711/135; 711/141; 711/146

(58) Field of Classification Search ............ 711/145
See application file for complete search history.

(56) References Cited

U.S. PATENT DOCUMENTS

| | | | | |
|---|---|---|---|---|
| 4,484,267 A | * | 11/1984 | Fletcher | 711/124 |
| 5,530,832 A | * | 6/1996 | So et al. | 711/122 |
| 5,694,573 A | * | 12/1997 | Cheong et al. | 711/122 |
| 5,835,963 A | * | 11/1998 | Yoshioka et al. | 711/207 |
| 5,996,048 A | * | 11/1999 | Cherabuddi et al. | 711/122 |
| 6,574,708 B2 | * | 6/2003 | Hayter et al. | 711/118 |
| 6,631,447 B1 | * | 10/2003 | Morioka et al. | 711/141 |
| 2002/0010836 A1 | * | 1/2002 | Barroso et al. | 711/122 |
| 2002/0184290 A1 | * | 12/2002 | Olszewski et al. | 709/102 |
| 2004/0039880 A1 | * | 2/2004 | Pentkovski et al. | 711/146 |
| 2005/0240736 A1 | * | 10/2005 | Shaw | 711/146 |

OTHER PUBLICATIONS

DeMiere, Eric."Processors: Benefits of L2 cache size", Sep. 2003. http://www.tek-tips.com/faqs.cfm?fid=4102.*

* cited by examiner

*Primary Examiner* — Kevin L Ellis
*Assistant Examiner* — Kalpit Parikh
(74) *Attorney, Agent, or Firm* — David P. McAbee

(57) ABSTRACT

This disclosure presents an architectural mechanism which allows a caching bridge to efficiently store data either inclusively or exclusively based upon information configured by an application. An INC bit is set for each access to a page table that indicates whether the data is shared or not shared by a LLC. This allows a multicore multiprocessor system to have a caching policy which enables use of the last level cache efficiently and results in improved performance of the multicore multiprocessor system.

23 Claims, 5 Drawing Sheets

EFFICIENT USAGE OF LAST LEVEL CACHES IN A MCMP SYSTEM USING APPLICATION LEVEL CONFIGURATION

BACKGROUND INFORMATION

Current multi-core processors contain multiple compute cores which are connected to an on-die shared cache through a caching bridge. Multi-processor systems which are constructed with multi-core processors maybe referred to as multi-core multiprocessor (MCMP) systems. MCMP systems are becoming increasingly popular in commercial server systems because of their improved scalability and modular design. In a multi-core processor a caching bridge enforces the caching policy for the shared cache. The on-die shared cache may also be referred to as the last level cache (LLC). The caching policy employed in the LLC has a direct effect on the overall performance and design complexity of the MCMP system.

Current designs have a caching policy that is decided statically at the time of design and is optimized for a specific workload. Most often these policies create designs which use the last level caches inefficiently, which results in data replication and thus affects the overall performance of the system. Therefore a need exists for a caching policy which enables use of the last level cache efficiently and results in improved performance of the MCMP system.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

Figure 1:
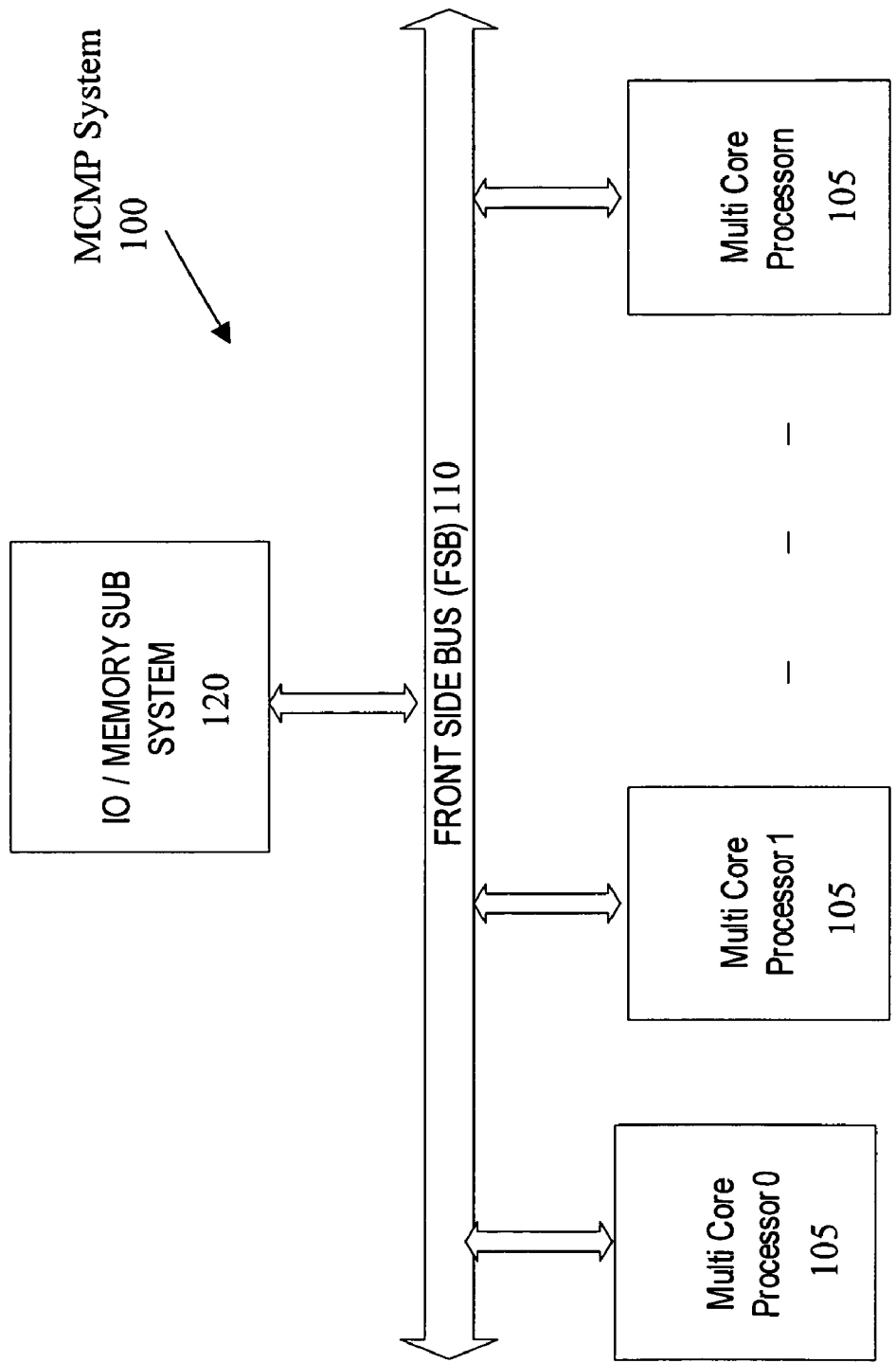
FIG. 1 is a block diagram of a MCMP system based on a FSB.
Figure 2:
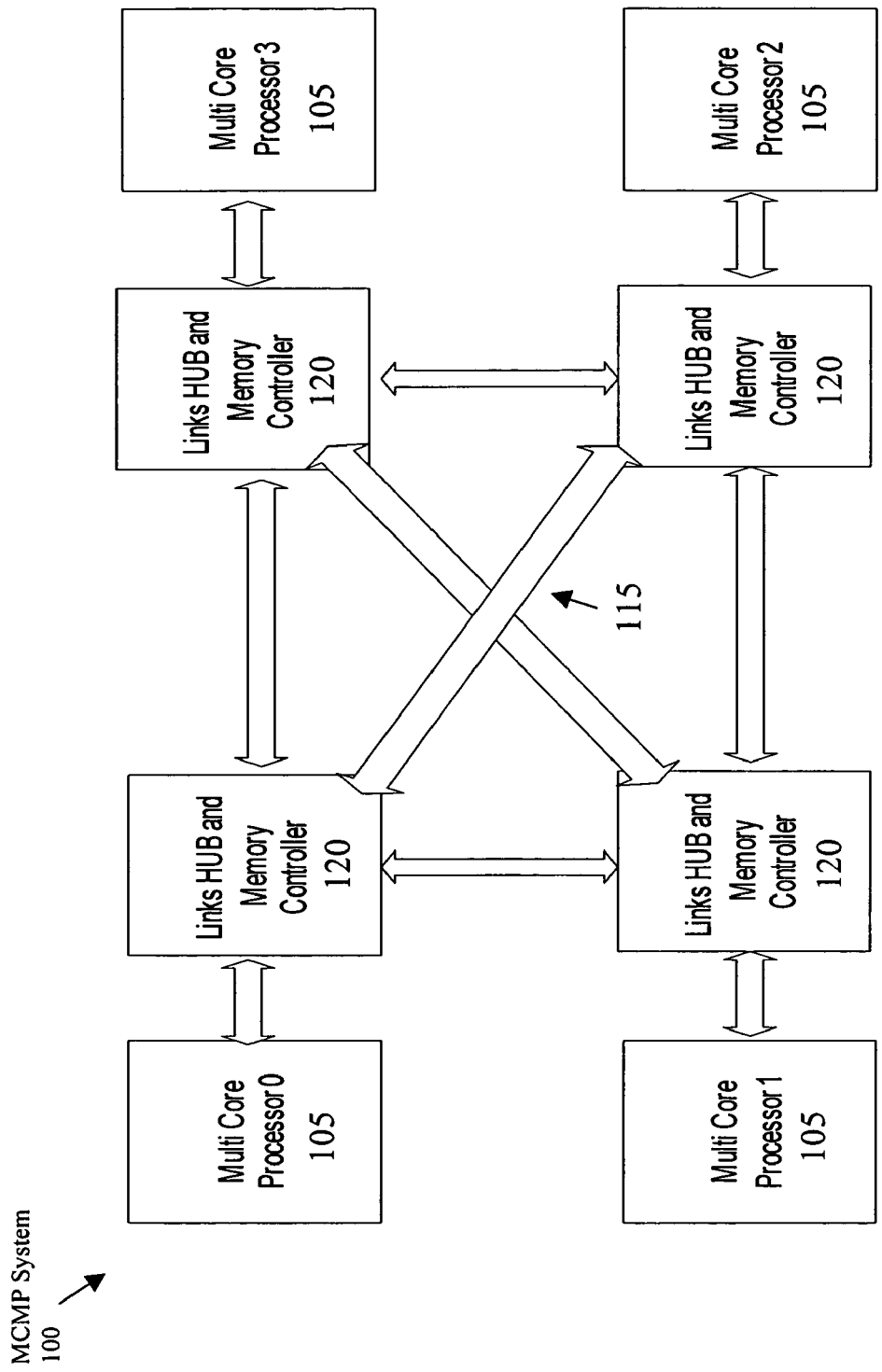
FIG. 2 is a block diagram of a MCMP system based on point to point links.

FIGS. 1 and 2 illustrate a multiprocessor system having a front side bus (FSB) and a point-to-point interconnect, respectively. Business applications, such as transaction processing, require multiprocessor systems which may execute large number of relatively independent threads. FIGS. 1 and 2 illustrate processors 105 in a MCMP system 100 connected to each other using a system interconnect. The system interconnect may be either a front side bus (FSB) 110, as shown in FIG. 1, or links based interconnect 115, as shown in FIG. 2, which supports point to point connections between the processors 105. Depending on the type of system interconnect 110, 115 used, processors 105 may use either a "bus based cache coherence" or a "directory based cache coherence" protocol to maintain cache coherence in the system 100. Each of the processors 105 are connected to memory 120 through the system interconnects.

Due to the presence of large number of executing threads in the MCMP system 100, the snooping traffic on the system bus is quite large when compared to a single processor system. The snoop traffic increases bandwidth pressure on the internal caches and slows down the execution threads in each of the processor cores 105. Therefore reducing the overall performance of the system 100.

Figure 3:
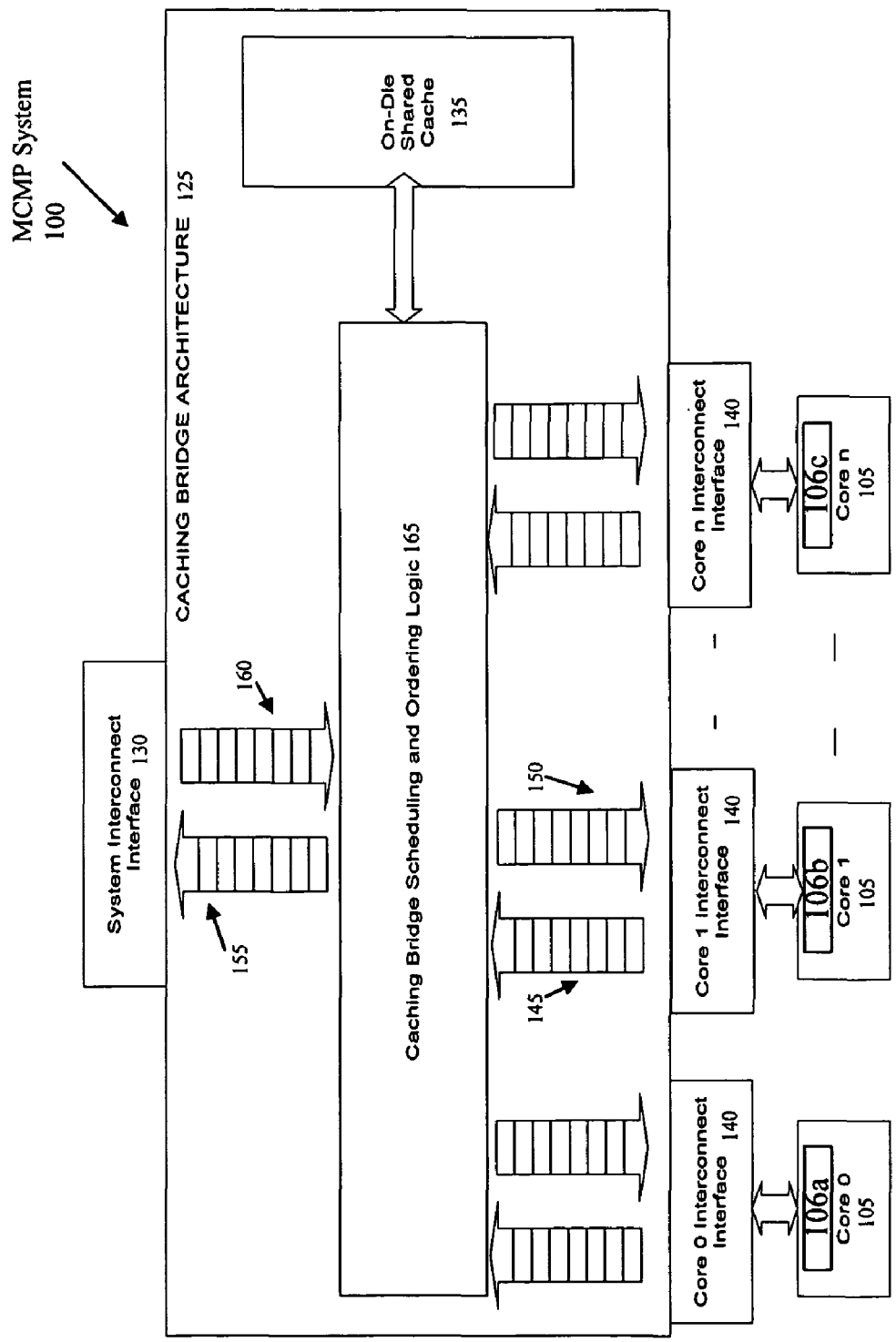
FIG. 3 is a block diagram of a MCMP system with a caching bridge.

FIG. 3 illustrates a MCMP system having a caching bridge. The system 100 includes a caching bridge 125 that bridges the external system 130, the LLC 135 and the cores in the processor 105. Each core in the processors 105 is connected to the bridge 125 through interconnect interfaces 140 on the bridge 125. The bridge 125 may contain one input and one output queue 145, 150 for requests originating from each core. There is also one input and one output queue 155, 160 for the requests that are sent to and received from the system interconnects 130. The bridge 125 is responsible for maintaining the coherency of the cache lines present in the LLC 135.

In current systems, for a inclusive property of a cache, when a snoop occurs on the LLC 135, and a line is not present in the LLC (a miss occurs), then the inclusive property also guarantees that the line is also not in the core caches. Thus, to maintain the inclusive property, the bridge logic 165 ensures that whenever a line is evicted from the LLC 135, back snoops are sent to the cores to remove the line from the core caches. Similarly all lines filled into the core caches are filled in to the LLC 135.

The issue with current systems employing the inclusive property of a cache is first, the lines evicted from the LLC 135 cause back snoop traffic to the core caches thus increasing the traffic on the core interfaces. Secondly, the amount of data replication that may result in the processors 105. This is because the sum total of all lines present in the core caches is replicated in the LLC 135. This works against the principle of increasing the size of the core caches to increase scalar performance. While increasing the size of core caches has the largest effect on the performance per thread it can increase the inefficiency of the LLC quite dramatically.

For current systems maintaining an exclusive property of a cache, the bridge logic 165 needs to ensure that when a snoop occurs and misses in the LLC 135, meaning line is not found in the LLC 135, it has to go to the core cache to obtain the line. In this instance, there is no data replication and no snoop filtering. The snoop has to go to the core cache for lines missed in the LLC 135.

The present disclosure attempts to resolve the above problem of presetting the data as either inclusive or exclusive by setting a bit in the page table to indicate if the attributes for a particular page should be inclusive or exclusive. For purposes of this disclosure the bit will herein be referred to as the INC bit. The INC bit may be added to the processors 105 page tables. Each core includes page tables, such as page tables 106a-c, where the page table contains attributes about that page. The INC bit would designate if a particular page of data is either inclusive or exclusive, rather than having the OS preset whether all the data is either inclusive or exclusive.

Since the OS is responsible for the page table, the OS may configure the INC bit. Whenever OS gives control to an application to run on the processor 105, it configures the page tables for that application. Every time there is a read to an address, the OS goes to the page table in the core. Thus, there is a page table for every access. If the core is sending a request to an interface, some of the page table attributes may be exposed. So the system 100 may do the configuration of the bit at this time by exposing the inclusive bit to the rest of the system 100.

Each application is best aware of the kind of data that is being used in different address spaces and thus is the best judge of whether inclusion or exclusion should be used for each individual access. There are several programming languages which provide semantics for expressing the sharing behavior of data explicitly in the program. Therefore, it would be best to allow the programs to make a decision on which pieces of data need what type of sharing.

Figure 4:
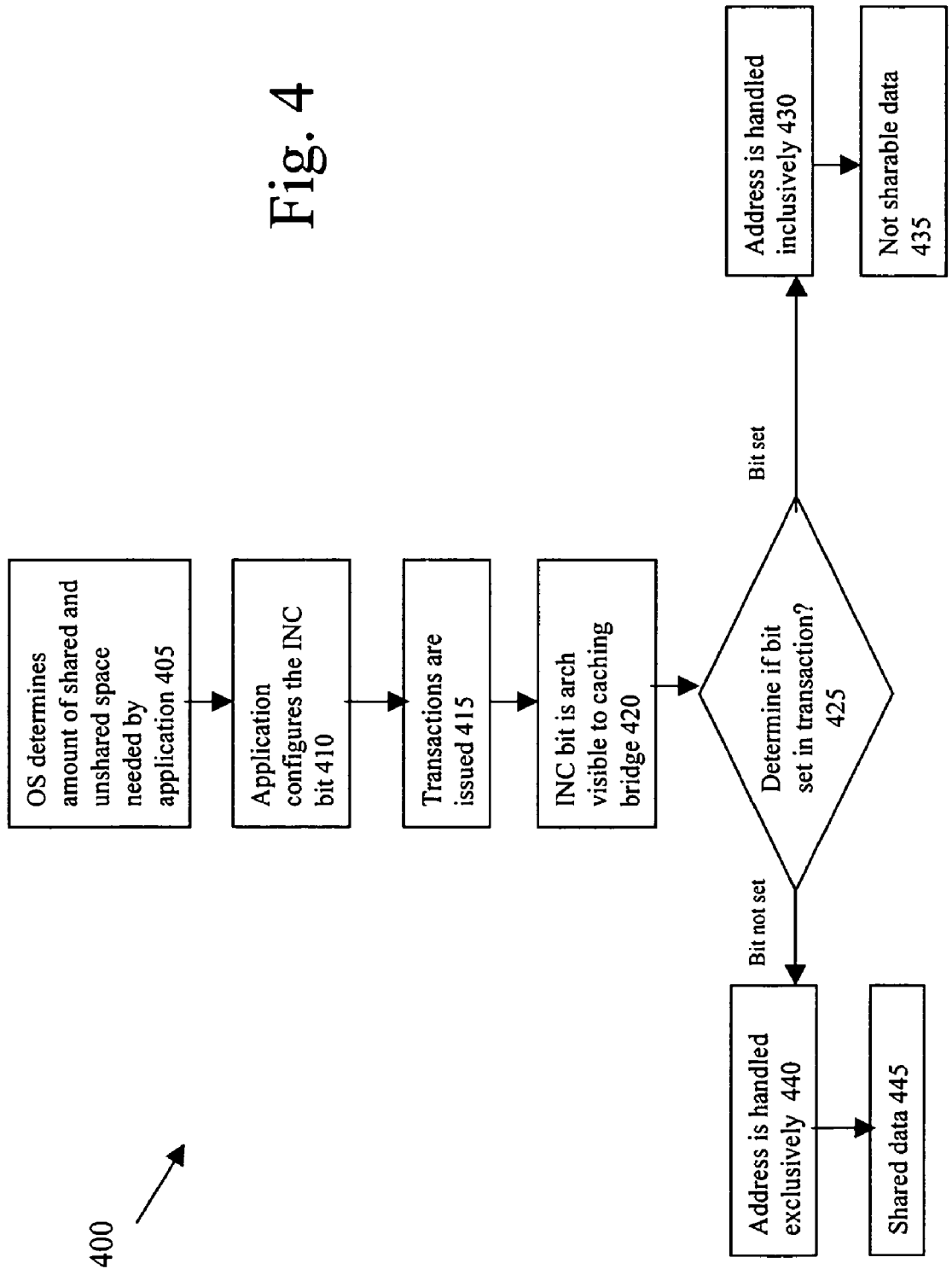
FIG. 4 is a flow chart illustrating one method of when an INC bit is set.

FIG. 4 illustrates one method 400 of determining if the INC bit should be set or not set for a particular application. Initially, an application is advised by the OS about the amount of shared and unshared space is needed by that application 405. The application then configures the INC bits based upon advise from the OS 410.

When transactions are issued 415, the core may make the INC bit architecturally visible to the caching bridge 420. Once architecturally visible to the caching bridge 125, the LLC 135 may carry the INC bit as a part of its tag. Each line may carry the INC bit to indicate whether the current application's preference is either inclusive or exclusive for that line.

Upon receiving the transaction, the caching bridge may now examine the INC bit 425. If the INC bit is set (bit=1), then the caching bridge 125 knows that this address is handled inclusively 430 and thus not shared 435. So the tag in the LLC 135 may be relied on to indicate exactly which other cores in the CMP contains the line.

However, if the INC bit is not set (bit=0), the data may be handled exclusively 440 and thus shared 445. The caching bridge 125 may look up the LLC 135 cache state. If the line is owned by the bridge 125 then the system 100 sends snoops to all other cores in the CMP. If the line is not owned by the bridge then a request is sent to the system 100.

Upon receiving a snoop from the system interconnect 130, the snooping queue may examine the INC bit in the transaction and the INC bit in the cache. If the INC bit it set (bit=1), on missing the LLC 135, the snoop may report a miss. The INC bit is set by applications to indicate that the current data should be handled inclusively. The applications are advised by the OS to set this bit for data that is not shared between many threads. Using the INC bit indicates the caches may act as efficient snoop filters. Since this data is not shared, incoming snoops are almost guaranteed to miss the LLC 135.

If INC bit is not set (bit=0), the data may be handled exclusively. The application is indicating that this data is shared between multiple threads and the snoops coming from other agents should be sent to lower level caches.

At evict time, if the INC bit is set, the LLC 135 sends snoops to the core to maintain inclusion. The inclusion traffic caused on the internal core interfaces is limited to only data that needs to be evicted from core caches. If the INC bit is not set, the line is dropped.

In summary, when the INC bit is configured by the application, OS may look at its profile and determine if the application needs a particular amount of shared area and unshared area. OS advises the pages for which the application has share information and the pages for which the application has unshared information. For the pages that are shared, the INC bit is not set and for the pages that are not shared the INC bit is set.

The INC bit is not binding on the architecture, but expresses the application preference towards how this data should be treated. Depending on hardware implementation, in some instances the INC bit may be ignored without any functional implementation.

In addition, the INC bit may be used by the different levels of caches in the cores to efficiently filter snoops and efficiently use the core caches. For simplicity, the present disclosure refers to these different levels of caches as LLC. The LLC may be substituted with any level cache in the core. The cores can make design decisions to fuse this bit to either inclusive or exclusive if the hardware is known to work only on a certain set of applications.

Accordingly, applications may now express the amount of shared and unshared area of data through this bit. Also, the application is able to express this at a page level granularity. Thereby providing an opportunity for application tuning for CMP workload based on efficient mapping of shared and unshared data.

Advantageously, the LLC is used more efficiently, the data that is known to be shared between the threads will not be replicated in the last level caches. This provides more space for the unshared data in the LLC, thus effectively increasing the total cache size available to each thread.

Figure 5:
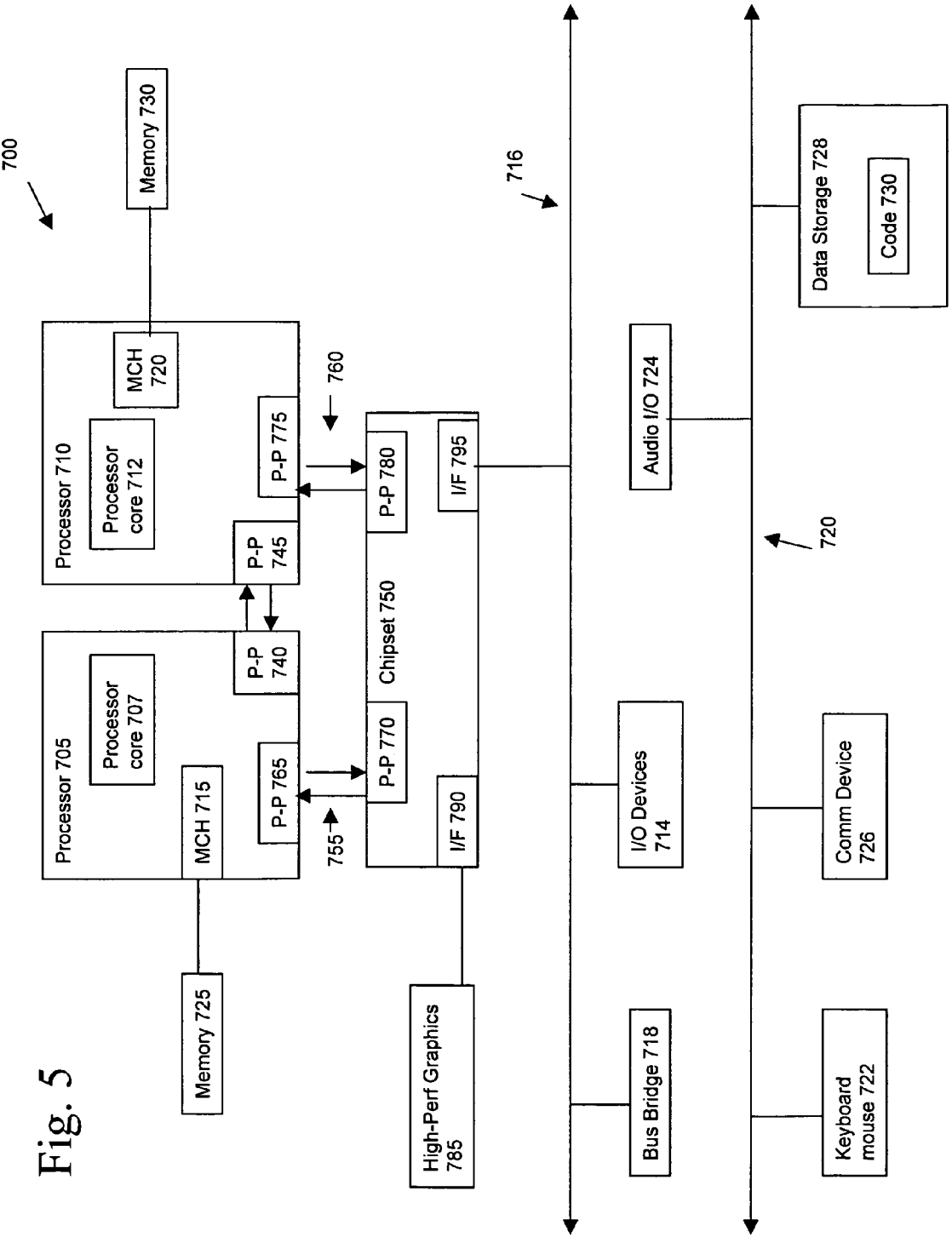
FIG. 5 is a block diagram of a system that may provide an environment for multithreaded processors according to one embodiment.

Referring now to FIG. 5, the system 700 includes processors supporting a lazy save and restore of registers. The system 700 generally shows a system where processors, memory, and input/output devices are interconnected by a number of point-to-point interfaces. The system 700 may also include several processors, of which only two, processors 705, 710 are shown for clarity. Each processor 705, 710 may each include a processor core 707, 712, respectively. Processors 705, 710 may each include a local memory controller hub (MCH) 715, 720 to connect with memory 725, 730. Processors 705, 710 may exchange data via a point-to-point interface 735 using point-to-point interface circuits 740, 745. Processors 705, 710 may each exchange data with a chipset 750 via individual point-to-point interfaces 755, 760 using point to point interface circuits 765, 770, 775, 780. Chipset 750 may also exchange data with a high-performance graphics circuit 785 via a high-performance graphics interface 790.

The chipset 750 may exchange data with a bus 716 via a bus interface 795. In either system, there may be various input/output I/O devices 714 on the bus 716, including in some embodiments low performance graphics controllers, video controllers, and networking controllers. Another bus bridge 718 may in some embodiments be used to permit data exchanges between bus 716 and bus 720. Bus 720 may in some embodiments be a small computer system interface (SCSI) bus, an integrated drive electronics (IDE) bus, or a universal serial bus (USB) bus. Additional I/O devices may be connected with bus 720. These may include keyboard and cursor control devices 722, including mouse, audio I/O 724, communications devices 726, including modems and network interfaces, and data storage devices 728. Software code 730 may be stored on data storage device 728. In some embodiments, data storage device 728 may be a fixed magnetic disk, a floppy disk drive, an optical disk drive, a magneto-optical disk drive, a magnetic tape, or non-volatile memory including flash memory.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

What is claimed is:

1. A processor comprising:
   a first processing core including a first low-level cache and a second processor core including a second low-level cache;
   page table storage associated with the first processing core, the page table storage adapted to hold an inclusive value to indicate a corresponding address is an inclusive address and an exclusive value to indicate the corresponding address is an exclusive address;
   a high level cache adapted to be shared by the first processing core and the second processing core;
   an interface adapted to communicate with other agents; and
   a cache bridge being adapted to receive a request from an agent referencing the corresponding address; to report a miss for the request from the agent without sending a snoop to the first and second processing cores responsive to the page table storage holding the inclusive value to indicate the corresponding address is an inclusive address and the high-level cache not containing a cache line for the corresponding address, and to issue a snoop to the first and second processing cores to determine if the cache line is within the first or the second low-level cache to determine if a miss is to be reported responsive to the page table storage holding the exclusive value to indicate the corresponding address is an exclusive address and the high-level cache not containing a cache line for the corresponding address.

2. The processor of claim 1, wherein the agent includes the first processing core.

3. The processor of claim 1, wherein the first processing core and the second processing core are logical cores.

4. The processor of claim 1, wherein the cache bridge is coupled to the low-level cache through a first input and first output queue, and wherein the cache bridge is coupled to the high level cache through a second input and second output queue.

5. The processor of claim 4, wherein the cache bridge is also coupled to a system interconnect to communicate with external devices.

6. The processor of claim 1, wherein the cache bridge is further adapted to initiate an eviction of the cache line corresponding to the corresponding address from the first low-level cache in response to the line being evicted from the high level cache when the page table storage holds the inclusive value to indicate the corresponding address is an inclusive address.

7. The processor of claim 1, wherein the cache bridge is further adapted to initiate a fill of the cache line in the high-level cache in response to the cache line being filled in the low-level cache when the page table storage holds the inclusive value to indicate the corresponding address is an inclusive address.

8. The processor of claim 1, wherein the cache bridge maintains coherency for data associated with transactions to be held in the high level cache.

9. The processor of claim 1 wherein the page table storage includes an inclusive (INC) field, which is adapted to hold an INC bit, and wherein the inclusive value includes the INC bit being set to a high logical value and the exclusive value includes the INC bit being set to a low logical value.

10. The processor of claim 9, wherein the INC bit is programmable by a user-application executing on the first processing core.

11. The processor of claim 9, wherein the INC bit is visible to the caching bridge.

12. The processor of claim 1, wherein the cache bridge is further adapted to not filter snoops to the cache line responsive to the page table storage holding the exclusive value to indicate the corresponding address is an exclusive address and the high-level cache not containing a cache line for the corresponding address.

13. The processor of claim 1, wherein the cache bridge is further adapted to not replicate data held in the first low-level cache in the high-level cache responsive to the page table storage holding the exclusive value to indicate the corresponding address is an exclusive address and the high-level cache not containing a cache line for the corresponding address.

14. A multi core multiprocessor system comprising:
    a multi-core processor including
      a first core comprising a first low-level cache, the first core adapted to hold: page table information, wherein the page table information is to include a field to hold a first value to indicate an address is inclusive and to hold a second value to indicate the address is exclusive; and
      a shared cache coupled to the first core and a second core,
      control logic, in response to a line of memory associated with the address being evicted from the shared memory, being adapted to issue a back snoop to the first low-level cache to evict the line of memory responsive to the field holding the first value to indicate the address is inclusive and being adapted not to issue a back snoop to the first low-level cache to evict the line of memory responsive to the field holding the second value to indicate the address is exclusive; and
    a system memory coupled to the multi-core processor and a second multi-core processor, the system memory to include a memory location associated with the address referenced by the transaction.

15. The multicore multiprocessor system of claim 14, wherein the control logic includes a caching bridge, the first core and the second core coupled through the caching bridge to the shared cache.

16. The multicore multiprocessor system of claim 15 wherein the caching bridge is to obtain the line of memory from the first low-level cache in response to missing the shared cache responsive to the field holding the second value to indicate the address associated with the line of memory is exclusive.

17. The multicore multiprocessor system of claim 15 wherein the field is to be set to either the first or second value in response to an application executing on the first core issuing an access to configure the field.

18. The multicore multiprocessor system of claim 17, wherein a tag held in the shared cache indicates if the first core includes the line of memory.

19. The multicore multiprocessor system of claim 14, wherein the system memory includes a random access memory (RAM).

20. An apparatus comprising:
a plurality of processing cores to share access to a shared cache, wherein a first processing core of the plurality of processing cores is to be associated with a first low level cache and page table storage logic, the page table storage logic to hold an inclusive field associated with at least a first address, wherein the inclusive field is adapted to be updated, by a user-level application, to a first value to indicate at least the first address is inclusive or to a second value to indicate at least the first address is exclusive; and
control logic coupled to the shared cache and to the first low level cache, in response to a line of memory associated with the first address being evicted from the shared cache, to issue a back snoop to the first low-level cache to evict the line of memory responsive to the inclusive field holding the first value and not to issue a back snoop to the first low-level cache to evict the line of memory responsive to the field holding the second value.

21. The apparatus of claim 20, wherein the control logic includes a caching bridge coupled between the shared cache and the first low level cache.

22. The apparatus of claim 20, wherein the control logic includes control logic of the shared cache.

23. The apparatus of claim 20, wherein the line of memory is to be filled with data before evicting the line of memory in response to a transaction associated with the user-level application, and wherein the control logic is to fill the data into the first low level cache responsive to the field holding the first value and is not to fill the data into the first low level cache in responsive to the field holding the second value.

* * * * *